(12) United States Patent
Capewell et al.

(10) Patent No.: US 6,685,382 B2
(45) Date of Patent: Feb. 3, 2004

(54) SCREW ACTUATOR

(75) Inventors: Terence John Capewell, Wheaton Aston (GB); Olivier Pansanel, Herblay (FR)

(73) Assignee: Lucas Industries Limited (GB)

( * ) Notice: Subject to any disclaimer, the term of this patent is extended or adjusted under 35 U.S.C. 154(b) by 0 days.

(21) Appl. No.: 10/157,170

(22) Filed: May 29, 2002

(65) Prior Publication Data

US 2002/0182006 A1 Dec. 5, 2002

(30) Foreign Application Priority Data

May 30, 2001 (GB) ............................................. 0112984

(51) Int. Cl.$^7$ ................................................ A47C 1/02
(52) U.S. Cl. ..................... 403/343; 74/89.42; 74/89.39; 74/89.23
(58) Field of Search ...................... 244/75 R; 74/89.27, 74/89.28, 89.42, 89.39, 424.82, 89.23; 403/343

(56) References Cited

U.S. PATENT DOCUMENTS 3,141,349 A * 7/1964 McDonald ............. 74/89.42 X
5,092,539 A * 3/1992 Caero ........................ 244/75 R
6,386,057 B1 * 5/2002 Thomas et al. ............. 74/89.28
6,401,557 B1 * 6/2002 Davies ....................... 74/89.39

* cited by examiner

Primary Examiner—John R. Cottingham
(74) Attorney, Agent, or Firm—Trexler, Bushnell, Giangiorgi, Blackstone and Marr, Ltd.

(57) ABSTRACT

A screw actuator comprises a rotatable input member and a non-rotatable primary output member, wherein the input member is provided with a screw thread formation within which a plurality of spherical members are received to provide a ball screw coupling between the input member and the primary output member. The actuator includes a secondary output arrangement having first and second screw threaded parts in screw treaded engagement with the input member to provide a screw thread coupling between the input member and the secondary output arrangement. The first and second screw threaded parts are axially movable relative to one another, whereby, in the event that the ball screw coupling fails, relative axial movement of the first and second screw threaded parts serves to lock the first and second screw threaded parts onto the input member, thereby to stall the actuator.

15 Claims, 4 Drawing Sheets

SCREW ACTUATOR

The invention relates to a screw actuator comprising a rotatable input member which cooperates with a primary, non-rotatable output member through a ball screw coupling such that rotational movement of the input member causes axial movement of the primary output member. In particular, but not exclusively, the invention relates to a screw actuator suitable for use in controlling the angle of inclination of a stabiliser on an aircraft.

Figure 1:
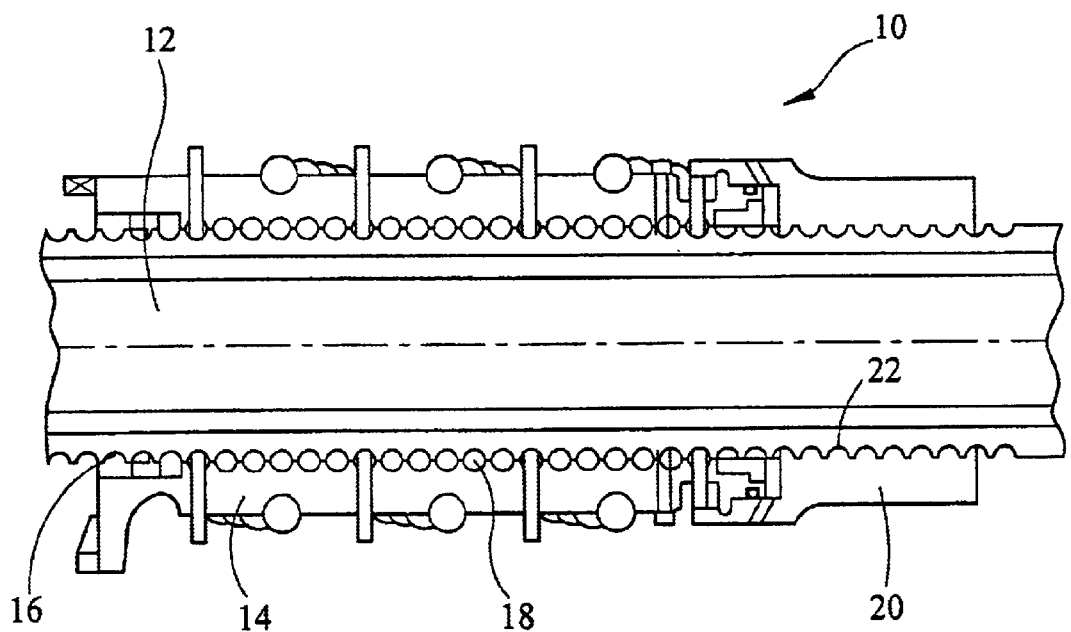

Known aircraft stabilisation systems include horizontal and vertical stabilisers mounted upon the aircraft fuselage which are arranged to provide directional stability when the aircraft is in flight. Referring to FIG. 1, the angle of inclination of the horizontal stabiliser (not shown) may be varied by means of a ball screw actuator, referred to generally as 10, comprising a rotatable input shaft 12 carrying a primary, non-rotatably mounted output nut 14. The primary nut 14 is provided with a helical groove which defines a screw thread formation 16 within which a plurality of balls 18 are in rolling engagement to provide a ball screw coupling between the input shaft 12 and the primary nut 14. Upon rotational movement of the input shaft 12, the primary nut 14 is caused to move axially relative to the input shaft 12. The primary nut 14 is coupled to the horizontal stabiliser through a suitable linkage to permit the angle of inclination of the horizontal stabiliser to be varied upon axial movement of the primary nut 14 relative to the input shaft 12.

The primary nut 14 may be coupled to a secondary nut 20 in screw threaded engagement with the input shaft 12 through a second screw thread formation 22 provided on the input shaft 12 such that axial movement of the primary nut 14 also causes the secondary nut 20 to move axially relative to the input shaft 12.

The ball screw coupling 16, 18 provides a relatively low friction coupling between the input shaft 12 and the primary nut 14, whereas the plain screw thread coupling between the input shaft 12 and the secondary nut 20 provides a relatively high friction coupling. Thus, in normal use, substantially all of the angular load on the input shaft 12 is imparted to the primary nut 14 through the low friction ball screw coupling 16, 18. The axial position of the secondary nut 20 relative to the screw thread 22 on the input shaft 12 is accurately set to ensure there is limited frictional loading of the secondary nut 20 in such circumstances.

In the event that the ball screw coupling 16, 18 fails, it is important that the actuator is stalled to prevent unwanted movement of the horizontal stabiliser. Should the primary nut 14 fail, the angular load applied by the input shaft 12 will be transferred to the secondary nut 20 through the high friction screw thread coupling such that further rotation of the input shaft 30 should cause the actuator to stall. However, it has been found that, in certain circumstances, the actuator only stalls through loading of the secondary nut 20 at a higher input load than desired. The screw thread 22 at the secondary nut 20 can therefore be caused to wear, and eventually may detach from the input shaft 12 altogether. In such circumstances, if the secondary actuator does not stall complete failure of the stabiliser may result.

It is an object of the present invention to provide a screw actuator which overcomes this problem.

According to the present invention, there is provided a screw actuator comprising a rotatable input member and a non-rotatable primary output member, wherein the input member is provided with a screw thread formation within which a plurality of spherical members are received to provide a ball screw coupling between the input member and the primary output member, a secondary output arrangement including first and second nuts in screw threaded engagement with the input member to provide a screw thread coupling between the input member and the secondary output arrangement, the first and second nuts being axially movable relative to one another, whereby, in the event that the ball screw coupling fails, relative axial movement of the first and second nuts serves to lock the first and second nuts onto the input member, thereby to stall the actuator.

In the event that the ball screw coupling fails, for example if the balls of the ball screw coupling break or the screw thread becomes stripped, load applied by the input member is transferred from the ball screw coupling to the plain screw thread coupling. Loading of the secondary output arrangement through the screw thread coupling urges the first and second nuts apart and causes the first and second nuts to be locked onto the input member, thereby stalling the actuator. The invention therefore provides the advantage that the actuator will always stall should the ball screw coupling fail.

In a preferred embodiment, the secondary output arrangement includes a ball/ramp arrangement arranged to impart relative axial movement to the first and second nuts of the secondary output arrangement in the event that the ball screw coupling fails.

The ball/ramp arrangement preferably comprises a plurality of spherical drive members which, in normal use, are urged into an equilibrium position in which they are engaged within respective recesses defined by the first and second nuts.

Preferably, the secondary output arrangement may be coupled to the primary output member.

The actuator preferably comprises a biasing arrangement, preferably comprising at least one spring, the biasing arrangement being arranged to apply a biasing force to the first nut so as to urge the spherical drive members into their equilibrium positions.

The spherical drive members are arranged to ride out of engagement with their respective recesses in the event that the ball screw coupling fails and load applied by the input member is transferred from the ball screw coupling to the screw thread coupling. As the spherical drive members ride out of engagement with their respective recesses, the first and second nuts are urged apart, against the biasing force of the biasing means, thereby causing the first and second nuts to be locked onto the input member. This ensures the actuator will always be stalled in the event that the ball screw coupling fails.

The ball screw actuator is particularly suitable for use in controlling a horizontal stabiliser on an aircraft but may also be used in other applications in which it is desirable to stall the actuator should the ball screw coupling fail.

The biasing means conveniently take the form of a multi spring assembly which acts on the first nut.

The secondary output arrangement preferably includes a non-rotatable nut housing which is axially moveable with the primary output member upon rotation of the input member, the first nut being coupled to the nut housing such that relative angular movement between the first nut and the nut housing is substantially prevented.

In a further embodiment, the secondary output arrangement includes a roller arrangement arranged to impart relative axial movement to the first and second nuts in the event that the ball screw coupling fails.

Preferably, the roller arrangement includes a threaded roller having a helix angle of substantially zero which co-operates with respective threads on radially outer surfaces on the first and second nuts.

More preferably, the threads on the radially outer surfaces of the first and second nuts are oppositely directed screw threads.

Preferably, the roller arrangement includes a shearable member coupling the second nut to the housing and arranged to shear, to break said coupling, in the event that the ball screw coupling fails, thereby to permit relative axial movement of the first and second nuts. More preferably, the shearable member is in the form of a pin.

Figure 2:
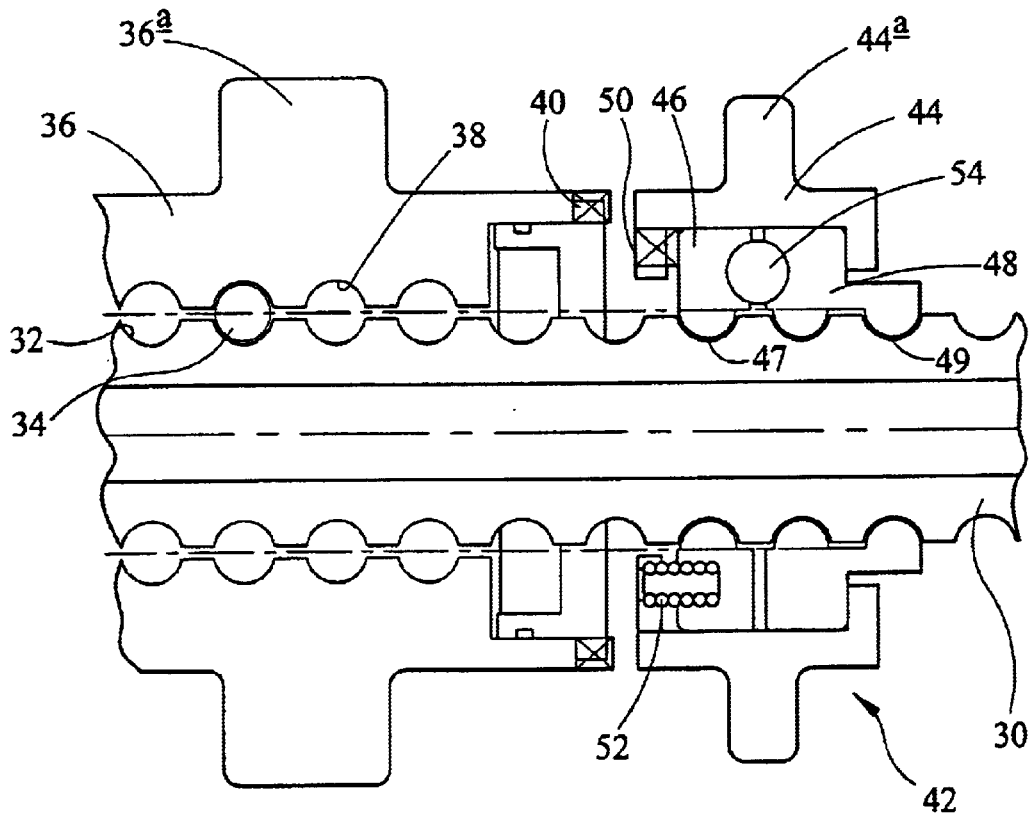
Figure 3:
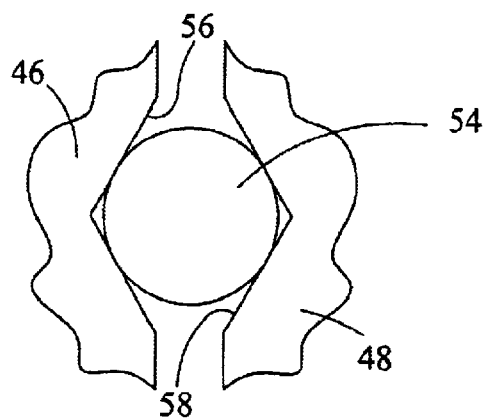
Figure 4:
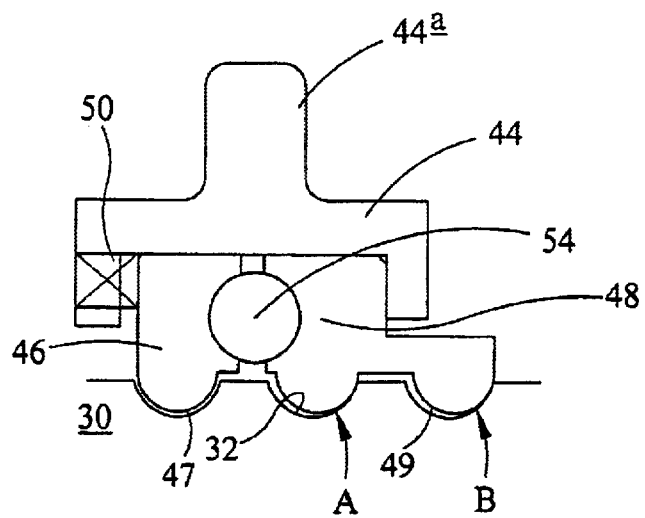
Figure 5:
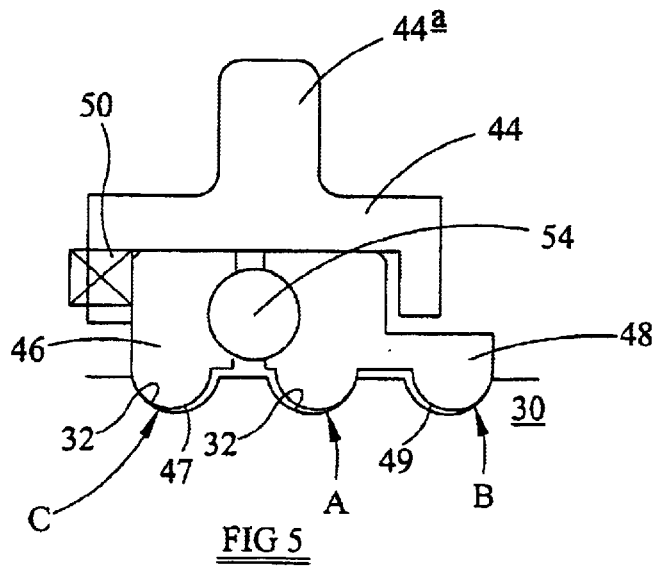
Figure 6:
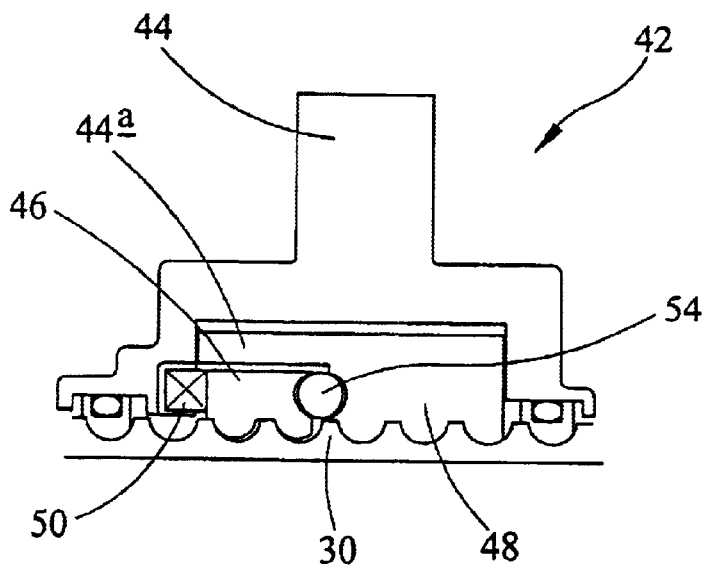
Figure 6:
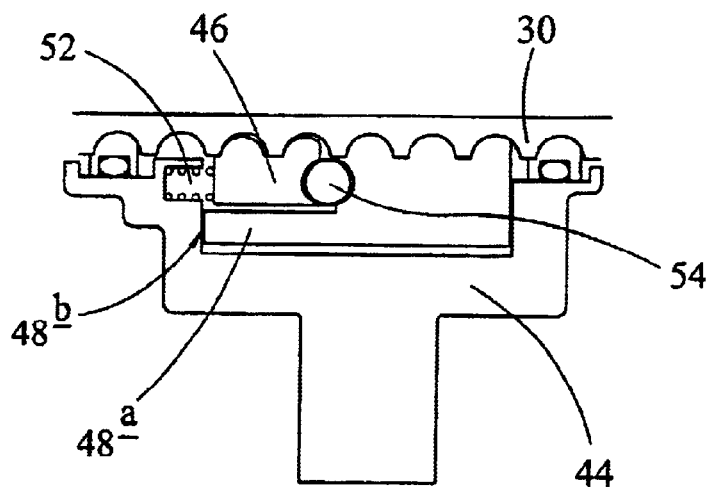
Figure 7:
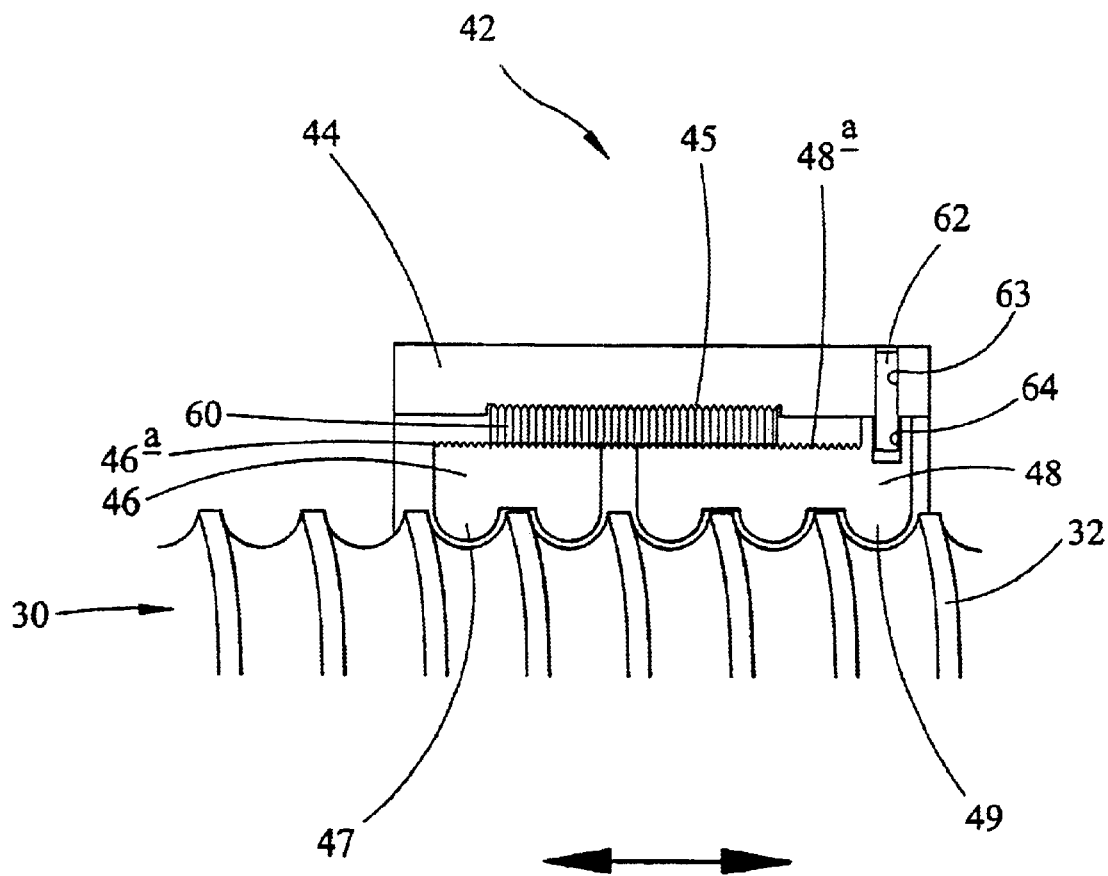

The invention will now be described, by way of example only, with reference to the accompanying drawing in which:

FIG. 1 is a sectional view of a part of a conventional screw actuator for use in controlling movement of a horizontal stabiliser on an aircraft, FIG. 2 is a sectional view of a part of a screw actuator in accordance with a first embodiment of the present invention when in a normal operating condition, FIG. 3 is an enlarged view of a ball/ramp arrangement forming part of the screw actuator in FIG. 2, FIG. 4 is a sectional view of a part of the screw actuator in FIG. 2 when the ball screw coupling of the actuator has just failed, FIG. 5 is a sectional view, similar to that shown in FIG. 4, of a part of the screw actuator when in a stalled condition following failure of the ball screw coupling, FIG. 6 is a sectional view of part of a screw actuator in accordance with an alternative embodiment of the present invention, and FIG. 7 is a sectional view of a part of a screw actuator in accordance with a further alternative embodiment of the present invention when in a normal operating condition.

Referring to FIG. 2, a ball screw actuator includes an input member in the form of a drive shaft 30 of tubular form which is arranged to be rotated, in use, by an appropriate motor (not shown) through a suitable gearing arrangement. The input shaft 30 is provided, on its outer surface, with a helical groove defining a first screw thread formation 32 within which a plurality of spherical members or balls 34 (only one of which is shown) is received. The input shaft 30 is secured, in use, to a part of an aircraft such that the shaft 30 is free to rotate but cannot move in an axial direction, or such that axial movement is limited.

The input shaft 30 carries a primary output member in the form of a nut 36 which is non-rotatably mounted upon a part of the aircraft frame through a dog 40. The primary nut 36 is provided with a second screw thread formation 38 which cooperates with the first screw thread formation 32 provided on the input shaft 30 to define, together with the balls 34, a high efficiency, low friction ball screw coupling between the input shaft 12 and the primary nut 36. The primary nut 36 includes a flanged region 36a which is secured, in use, to a linkage (not shown) in connection with the horizontal stabiliser. As the primary nut 36 is non-rotatably mounted upon the aircraft, in normal use when the actuator is functioning correctly, rotational movement of the input shaft 30 imparts axial movement (translation) to the primary nut 36 through the ball screw coupling to enable the angle of inclination of the horizontal stabiliser to be adjusted.

The input shaft 30 also carries a secondary nut arrangement, referred to generally as 42, comprising a non-rotatable nut housing 44 including a flange or spigot 44a which is coupled to the horizontal stabiliser. The nut housing 44 may also be coupled to the primary nut 36 such that it is axially movable with the nut 36 upon rotation of the input shaft 30. Alternatively, the nut housing 44 may be coupled to the structure of the aircraft. It is important that the primary and secondary load paths are separate and that the secondary load path should be unloaded in normal operating conditions. The secondary nut arrangement 42 also includes first and second nuts, 46, 48 respectively, the first and second nuts 46, 48 being provided with third and fourth screw thread formations 47, 49 respectively which are co-operable with the screw thread formation 32 provided on the input shaft 30 to provide relatively high friction screw thread couplings between the input shaft 30 and the secondary nut arrangement 42. The first nut 46 is coupled to the nut housing 44 through a dog 50 and is accurately positioned such that, in normal use, the first nut 46 adopts an equilibrium position (as shown in FIG. 2), in which a narrow clearance is maintained between each of the third and fourth screw thread formations 47, 49 and the first screw thread formation 32 on the input shaft 30. The dog 50 ensures relative angular movement between the first nut 46 and the nut housing 44 is prevented, but permits a small degree of axial movement between these components. The second nut 48 is arranged such that it is free to rotate relative to both the first nut 46 and the nut housing 44 in the event that an angular load is applied to the second nut 48.

A plurality of spherical drive members 54 are located between the first and second nuts 46, 48, the spherical drive members 54 being located within respective recesses or grooves (not visible in FIG. 2) defined by opposing surfaces of the first and second nuts 46, 48. As can be seen most clearly in FIG. 3, the recesses provided in the first and second nuts 46, 48 define ramped surfaces 56, 58 with which the drive members 54 are engageable. A spring assembly 52 is provided which acts on the first nut 46 and serves to retain the drive members 54 in their equilibrium positions within their respective recesses.

When the actuator is in normal use and is functioning correctly, rotation of the input shaft 30 by the motor causes the primary nut 36 to move axially relative to the input shaft 30 and, thus, the angle of inclination of the horizontal stabiliser to which the primary nut 36 is linked can be adjusted. In such circumstances, the actuator is said to be in a normal operating condition and the secondary nut arrangement 42 adopts the position shown in FIG. 2 in which the biasing force of the spring assembly 52 serves to urge the first nut 46 towards the second nut 48 to retain the drive members 54 in their equilibrium positions in which they are engaged within their respective recesses. As the first nut 46 is positioned such that a narrow clearance is maintained between the third and fourth screw thread formations 47, 49 and the screw thread formation 32 provided in the input shaft 30 (as shown in FIG. 2), the first and second nuts 46, 48 are free to translate along the screw thread formation 32 upon rotation of the input shaft 30.

The ball screw coupling between the input shaft 30 and the primary nut 36 forms a much lower friction coupling than the screw thread couplings between the input shaft 30 and the first nut 46, and between the input shaft 30 and the second nut 48. When the actuator is in the normal operating condition substantially all of the angular load imparted by the input shaft 30 is taken up by the primary nut 36. As the primary nut 36 moves axially along the input shaft 30, together with the nut housing 44, drive is imparted to the first nut 46, and hence the second nut 48, through the drive dog 50 such that the first and second nuts 46, 48 translate along the first screw thread formation 32 on the input shaft 30. In view of the narrow clearances between the screw thread formations 32, 49, there is substantially no frictional loading of the second nut 48 such that the second nut 48 is not caused to rotate.

Should the ball screw coupling between the input shaft 30 and the primary nut 36 fail due to failure of the screw thread formation 32 or the balls 34, the load imparted by the input shaft 30, either tensile or compressive, is transferred to the screw thread coupling and, hence, is transferred to the secondary nut arrangement 42 through the first and second nuts 46, 48. As the first nut 46 is coupled to the non-rotatably mounted housing 44, the first nut 46 cannot rotate as angular load is taken up by the screw thread couplings, but the second nut 48 is free to rotate relative to the input shaft 30 such that the screw thread formation 49 provided on the second nut 48 is urged into contact with the screw thread formation 32, as shown in FIG. 4, at points A and B. Frictional contact between the fourth screw thread formation 49 on the second nut 48 and the first screw thread formation 32 on the input shaft 30 applies a load to the second nut 48 which acts against the biasing force of the spring assembly 52, thereby urging the drive members 54 to ride up their respective ramped surfaces 56, 58, out of engagement with their respective recesses. As the drive members 54 are caused to ride up the ramp surfaces 56, 58, axial movement is imparted to the first nut 46 relative to the second nut 48 and, hence, the third screw thread formation 47 provided on the first nut 46 is urged into contact with the screw thread formation 32 on the input shaft 30 at point C, as shown in FIG. 5. In this position, the first and second nuts 46, 48 are locked onto the screw thread formation 32 on the input shaft 30 causing the actuator to be stalled and preventing further axial movement of the nut housing 44 and, hence, of the aircraft stabiliser.

It will be appreciated that in order for the actuator to operate as described, the first and second nuts 46, 48 should be formed from a material which provides a relatively high frictional force when their respective screw thread formations 47, 49 are urged into engagement with the screw thread formation 32 on the input shaft 30.

FIG. 6 shows a preferred embodiment of the invention in which the second nut 48 includes a flange 48<u>a</u> having an end face 48<u>b</u> which is arranged to engage a surface of the nut housing 44. The coefficient of friction between the surface 48<u>b</u> and the surface of the nut housing 44 is relatively low to ensure that, even when the drive members 54 urge the first and second nuts 46, 48 apart, relative angular movement is permitted between the second nut 48 and the housing 44. For example, the surface 48<u>b</u> and/or the facing surface of the nut housing 44 may be provided with a suitable anti-friction coating. Thus, should the ball screw coupling between the input shaft 30 and the primary nut 36 fail causing angular load applied by the input shaft 30 to be taken up by the screw thread couplings, the load applied to the second nut 48 results in relative angular movement between the second nut 48 and the first nut 46. As described previously, relative angular movement between the first and second nuts 46, 48 causes the drive members 54 to ride up their respective ramped surfaces 56, 58 to impart relative axial movement to the first and second nuts 46, 48, the resulting contact between the screw thread formations 47, 49 on the first and second nuts 46, 48 and the screw thread formation 32 on the input shaft 30 causing the actuator to stall. The embodiment shown in FIG. 6 provides an advantage over that shown in FIGS. 4 and 5 in that the load imparted to the secondary nut arrangement 42 upon failure of the ball screw coupling is transferred directly to the nut housing 44 through the second nut 48, rather than being transferred through the first nut 46 also.

It will be appreciated that in the event that the ball screw coupling fails, regardless of the direction of the angular load transferred through the screw thread coupling 32, 47, 49 to the secondary nut arrangement 42 there will be relative angular movement between the first and second nuts 46, 48 to cause the drive members 54 to move and the actuator to stall. Thus, the actuator will stall for both compressive and tensile loading of the screw thread coupling by the input shaft 30.

In either the embodiment shown in FIGS. 4 and 5 or that shown in FIG. 6, if failure of the ball screw coupling between the input shaft 30 and the primary nut 36 is only temporary such that the angular load transferred through the screw thread coupling 32, 47, 49 to the secondary nut arrangement 42 is removed upon recovery of the ball screw coupling 32, 34, the drive members 54 will be urged back into their equilibrium positions under the biasing force of the spring assembly 52 and normal operation of the actuator will resume. However, any failure that causes the secondary nut arrangement 42 to become loaded is extremely serious and irrecoverable in respect of continued stabiliser operation.

FIG. 7 shows an alternative configuration of the secondary nut arrangement 42 in accordance with a further embodiment of the invention. In this embodiment, relative angular movement of both the first and second nuts 46, 48 of the secondary nut arrangement 42 relative to the housing 44 is permitted in conditions in which the ball screw coupling between the input shaft 30 and the primary nut 36 fails. The position of the first and second nuts 46, 48 relative to the input shaft 30 is under the control of a roller arrangement including a roller 60 and a pin 62. The roller 60 is engaged between radially outer surfaces of the first and second nuts 46, 48 and a part threaded, radially inner surface 45 of the housing 44 having a helix angle of substantially zero. The outer surface of the roller 60 also has a thread with a helix angle of zero which co-operates with the identical thread on the surface 45 so that the roller 60 is freely rotatable in normal operation. The first and second nuts 46, 48 have opposing helical threads on their radially outer surfaces 46a, 48a which co-operate with the thread on the roller 60. The pin 62 is received within corresponding recesses or grooves 63, 64 provided in the housing 44 and the second nut 48 respectively and serves to aid fixed location of the two parts 44, 48 relative to one another in normal operating circumstances.

Under normal operating conditions, in which the primary nut takes up substantially all of the angular load imparted by the input shaft 30, the first and second nuts 46, 48 are maintained in position by the pin 62 which prevents rotational movement of the second nut 48 in relation to the nut housing 44. If a load is imparted to the secondary nut arrangement 42 through the first and second nuts 46, 48 due to failure of the ball screw coupling, the second nut 48 is caused to rotate by interaction with the input shaft 30, as described previously. Angular movement of the second nut 48 results in a force being applied to the pin 62 which causes it to shear. Shearing of the pin 62 allows the first and second nuts 46, 48 to rotate and co-operation between the thread on the surface 48a of the second nut 48 with the thread on the roller 60 also causes the roller 60 to rotate. Rotation of the roller 60 results in rotation of the first nut 46 and co-operation between the opposing helical threads on the first and second nuts 46, 48 with the thread on the roller 60 results in axial translation of the first and second nuts 46, 48 in opposite directions. This axial movement results in the third and fourth screw thread formations 47, 49 being urged into contact with the screw thread formation 32 on the input shaft 30 and prevents further axial movement of the nut housing 44, thereby causing the actuator to stall.

In any of the aforementioned embodiments, a position sensor may be provided on the secondary nut arrangement 42, if required, to sense angular movement of the second nut 48 and/or axial movement of the first and/or second nuts 46, 48 in the event that the angular load applied by the input shaft 30 is transferred from the ball screw coupling of the primary nut 36 to the screw thread coupling of the secondary nut arrangement 42. For example, the position sensor may take the form of an LVDT for sensing translation of the first nut 46 and/or the second nut 48, or may take the form of an RVDT for sensing angular movement of the second nut 48. In the event that the position sensor provides an output signal to indicate angular movement of the second nut 48 and/or relative axial movement between the first and second nuts 46, 48, a warning signal may be provided to the aircraft flight control deck to warn the pilot of actuator failure.

We claim:

1. A screw actuator comprising a rotatable input member and a non-rotatable primary output member, wherein the input member is provided with a screw thread formation within which a plurality of spherical members are received to provide a ball screw coupling between the input member and the primary output member, a secondary output arrangement including first and second screw threaded parts in screw threaded engagement with the input member to provide a screw thread coupling between the input member and the secondary output arrangement, said first and second screw threaded parts being capable of relative angular and axial movement, and said secondary output arrangement incorporating an axial drive mechanism for generating relative axial movement of said first and second screw threaded parts in response to relative angular movement of said first and second screw threaded parts, whereby, in the event that the ball screw coupling fails, relative angular movement of the first and second screw threaded parts occurs resulting in relative axial movement of said first and second screw threaded parts serving to lock the first and second screw threaded parts onto the input member, thereby to stall the actuator.

2. A screw actuator according to claim 1, in which the first and second screw threaded parts are nuts.

3. A screw actuator according to claim 1, in which the secondary output arrangement is coupled to the primary output member.

4. A screw actuator according to claim 1, in which said axial drive mechanism includes a ball/ramp arrangement arranged to impart relative axial movement to the first and second parts of the secondary output arrangement as a result of relative angular movement of said first and second screw threaded parts in the event that the ball screw coupling fails.

5. A screw actuator according to claim 4, in which the ball/ramp arrangement comprises a plurality of spherical drive members which, in normal use, are urged into an equilibrium position in which they are engaged within respective recesses defined by the first and second parts.

6. A screw actuator according to claim 1, in which the actuator further comprises a biasing arrangement.

7. A screw actuator according to claim 6, in which the biasing arrangement comprises at least one spring, wherein the biasing arrangement is arranged to apply a biasing force to the first part so as to urge the spherical drive members into their equilibrium positions.

8. A screw actuator according to claim 3, in which the spherical drive members are arranged to ride out of engagement with their respective recesses in the event that the ball screw coupling fails and load applied by the input member is transferred from the ball screw coupling to the screw thread coupling and whereby, as the spherical drive members ride out of engagement with their respective recesses, the first and second parts are urged apart, against the biasing force of the biasing means, thereby causing the first and second parts to be locked onto the input member.

9. A screw actuator according to claim 6, in which the biasing arrangement takes the form of a multi spring assembly which acts on the first part.

10. A screw actuator according to claim 1, in which the secondary output arrangement includes a non-rotatable housing which is axially moveable with the primary output member upon rotation of the input member, the first part being coupled to the housing such that relative angular movement between the first part and the housing is substantially prevented.

11. A screw actuator according to claim 1, in which said axial drive mechanism includes a roller arrangement arranged to impart relative axial movement to the first and second parts in the event that the ball screw coupling fails.

12. A screw actuator according to claim 11, in which the roller arrangement includes a threaded roller having a helix angle of substantially zero which co-operates with respective screw threads on radially outer surfaces on the first and second parts.

13. A screw actuator according to claim 12, in which the threads on the radially outer surfaces of the first and second parts are oppositely directed screw threads.

14. A screw actuator according to claim 11, wherein the roller arrangement includes a shearable member coupling the second part to the housing and arranged to shear, to break said coupling, in the event that the ball screw coupling fails, thereby to permit relative axial movement of the first and second parts.

15. A screw actuator according to claim 14, in which the shearable member is in the form of a pin.

* * * * *